US006442456B2

(12) United States Patent
Burns et al.

(10) Patent No.: US 6,442,456 B2
(45) Date of Patent: Aug. 27, 2002

(54) ANTI-RUT SYSTEM FOR AUTONOMOUS-VEHICLE GUIDANCE

(75) Inventors: Ray L. Burns, St. David; Vadim Parfenov, Tucson, both of AZ (US)

(73) Assignee: Modular Mining Systems, Inc., Tucson, AZ (US)

( * ) Notice: Subject to any disclaimer, the term of this patent is extended or adjusted under 35 U.S.C. 154(b) by 0 days.

(21) Appl. No.: 09/776,277

(22) Filed: Feb. 2, 2001

Related U.S. Application Data

(63) Continuation-in-part of application No. 09/521,436, filed on Mar. 7, 2000.

(51) Int. Cl.[7] .............................................. G01C 22/00
(52) U.S. Cl. ........................................... 701/23; 701/26
(58) Field of Search .............................. 701/23, 24, 25, 701/26, 27, 28, 200, 201, 207, 208, 209, 210, 213, 300; 180/168, 204

(56) References Cited

U.S. PATENT DOCUMENTS 5,002,145 A * 3/1991 Wakaumi et al. ............ 180/168
5,925,080 A * 7/1999 Shimbara et al. ............ 701/23
6,138,063 A * 10/2000 Himeda ....................... 701/23
6,142,252 A * 11/2000 Kinto et al. .................. 180/204
6,154,152 A * 11/2000 Ito ................................ 701/208

* cited by examiner

*Primary Examiner*—Richard M. Camby
(74) *Attorney, Agent, or Firm*—Antonio R. Durando; Durando Birdwell & Janke, PLC

(57) ABSTRACT

In a vehicle traffic system, the predetermined nominal trajectory for an autonomous vehicle is varied periodically within acceptable boundaries which define a permitted travel corridor. The corridor's boundaries ensure the continued safe and controlled operation of the vehicle within the system. In an embodiment of the invention, alternative trajectories are selected randomly; in another, they are parallel to one another. In yet another, preferred embodiment, judiciously-selected, alternative trajectories are repeated periodically according to a predetermined schedule designed to avoid repetitive travel over the same precise path, and possibly also selected for optimal results under different terrain, environmental, and/or operational conditions. According to another aspect of the invention, the shape and size of the corridor defining the boundaries for safe operation are varied in response to changed conditions to increase operational flexibility. Thus, by avoiding repeated passage precisely over the path of the nominal trajectory, rutting on the road is greatly reduced and a more uniform surface is maintained for travel.

17 Claims, 6 Drawing Sheets

ANTI-RUT SYSTEM FOR AUTONOMOUS-VEHICLE GUIDANCE

RELATED APPLICATIONS

This is a continuation-in-part application of U.S. Ser. No. 09/521,436, filed on Mar. 7, 2000 pending.

BACKGROUND OF THE INVENTION

1. Field of the Invention

This invention is related in general to autonomous vehicles operating in a surface facility, such as a surface mine. In particular, the invention relates to a method for avoiding the formation of ruts and similar road damage caused by the repetitive passage of autonomously-guided vehicles over prescribed travel trajectories.

2. Description of the Related Art

Autonomous vehicles operating in a surface facility such as a mine are controlled by tracking the position of each vehicle in the system and by guiding the vehicle safely along a predetermined course. Guidance control signals may be generated from a central location, a peripheral position, other vehicles, or directly from within the vehicle. Typically, the position of the vehicle is continuously monitored and controlled by a central or satellite center transmitting control signals to the vehicle's on-board computer, based on current mine conditions and in response to position information communicated by the vehicle. Alternatively, the vehicles's own on-board computer can produce appropriate control signals to the vehicle as a function of its position and additional information received from external components of the guidance system. Knowing the current position of the vehicle with respect to known fixed obstacles and other mine equipment, the vehicle can be maneuvered to its destinations by the continuous control of its operating functions (for example, steering-wheel, accelerator and brake position of a truck). An on-board satellite-based positioning system (such as GPS) or an equivalent positioning unit (either of which can be supplemented with an inertial navigation system or the like) can be used to determine the current position of the vehicle, with an on-board transmitter/receiver unit to communicate with the control center, and on-board microprocessing and storage modules with appropriate hardware and software can also be used to effect the actual movement and guidance of the vehicle. Every operating function is manipulated to cause the vehicle to follow a predetermined trajectory that can be modified by current control instructions to meet particular up-to-date traffic conditions. Hazards are avoided by implementing a predetermined control response when a hazard is identified by the system. For example, if a potential obstacle is detected within a certain distance of the vehicle being monitored, the path of the vehicle is modified to avoid collision. Thus, for the purposes of this disclosure, the term "autonomous" is intended to refer to the availability of either on-board or off-board automated supervisory systems for controlling the movement of a vehicle.

Surface mines utilize a variety of work machines for excavating and transporting ore, grading and stabilizing roadways and slopes in the mine pit, and for providing all support functions necessary for the operation of a mine. In the past, most work and haulage machines have been human-operated, mobile pieces of equipment constantly being moved around the surface of the mine. Skilled operators ensure that each machine or vehicle is positioned in the right place and optimally oriented to perform its intended function while avoiding accidents and injury to people and property. In order to improve efficiency, much effort is currently under way to develop automated systems for controlling the operation of such work machines in surface mines and other environments. Therefore, this invention is described in the context of a surface mine operation, but its concept is applicable to any operation involving moving equipment (such as at waste sites and in underground mining, or in digging, shipping, trucking, and automotive operations) and should not be understood to be limited to surface mines.

As mentioned, the function of each autonomous vehicle in a surface mine is performed according to a predetermined trajectory related to its particular task and implemented by a guidance system through on-board GPS and two-way communication hardware. The roadways of mines are typically temporary and subject to frequent changes to adapt to varied operating conditions. Therefore, such roads normally consist of unpaved dirt routes that are easily damaged by vehicle traffic. In particular, the repetitive passage of autonomous vehicles over the same predetermined trajectories unavoidably causes ruts in the roads that can affect the efficiency and operation of the roads. Operators of manned vehicles can try and minimize this problem by avoiding existing cuts as they begin to appear on the road, thereby reduce the formation of deep ruts. Unmanned vehicles, on the other hand, are programmed to follow a preselected trajectory as precisely as possible, and much effort is dedicated, primarily for safety concerns and work efficiency, to ensure that deviations from that trajectory are minimized during the course of autonomous operation. Given the current state of the art, autonomous vehicles can be controlled to follow a path with maximum deviations in the order of centimeters. Thus, the formation of ruts is an inherent problem of autonomous-vehicle traffic on dirt roads. This invention is directed at reducing the rutting caused by the operation of such vehicles.

BRIEF SUMMARY OF THE INVENTION

The primary objective of this invention is a guidance control system for reducing the formation of ruts in roadways travelled by autonomous vehicles in a mining or similar operation.

Another objective is an approach that can be integrated with existing guidance systems for autonomous-vehicle operation on dirt roads of industrial facilities, in particular surface mines.

Another goal is a system that is suitable for automated implementation with current autonomous equipment, in particular surface-mine haulage and mining equipment.

A final objective is a system that can be implemented economically according to the above stated criteria.

Therefore, according to these and other objectives, the present invention involves linking each autonomous vehicle and/or other moving equipment in a surface-mine facility to a control center for communicating data and control signals. The function of each autonomous vehicle is performed automatically by causing it to track a predetermined nominal trajectory related to its particular task and is implemented using on-board GPS and two-way communication hardware. The current position of the vehicle is continuously monitored and correlated to the position of potential hazards along its path, so that corrective action can be taken by implementing appropriate, predetermined control strategies.

According to the invention, the predetermined nominal trajectory for each vehicle is varied periodically within acceptable boundaries which define a travel corridor that ensures the continued safe and controlled operation of the vehicle within the system while avoiding the formation of ruts in the roadway. In an embodiment of the invention, the deviation is selected randomly from alternative trajectories that ensure a continuous and steady travel within the corridor containing the original nominal trajectory. By avoiding repeated passage precisely over the path of the nominal trajectory, wear on the road is greatly reduced and a more uniform surface is maintained for travel.

According to another embodiment of the invention, the guidance system may provide for multiple trajectories consisting of parallel paths to be used alternatively in order to avoid rutting of the roadway. In yet another, preferred embodiment, judiciously-selected, alternative trajectories are repeated periodically according to a predetermined schedule designed to avoid repetitive travel over the same precise path, and possibly also selected for optimal results under different terrain, environmental, and/or operational conditions.

According to another aspect of the invention, the shape and size of the corridor defining the boundaries for safe operation along the nominal trajectory are varied dynamically to increase operational flexibility within the safety requirements for current traffic conditions facing the vehicle as it performs its autonomous function along its predetermined path. For example, the width of the corridor may be increased when the autonomous vehicle is traveling alone, or decreased when it is in a high-traffic zone. Thus, the corridor may be dynamically adjusted for each vehicle as circumstances change during the performance of its autonomous function.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The heart of this invention lies in the idea of introducing variations in the precisely-controlled path followed by autonomous vehicles traveling on the roadways of a surface mine. By avoiding repetitive passage over the same trajectory, the formation of undesirable ruts is prevented, or at least greatly reduced.

For the purposes of this disclosure, it is understood that every reference to a vehicle is intended to apply as well to any other movable piece of equipment that may be found in a surface mine or other facility employing autonomous vehicles. The term "trajectory" of a vehicle is intended to mean the predetermined path assigned to the vehicle so that it can perform its intended task. Accordingly, it refers to the set of x,y,z positions defining a trajectory to be followed by a reference point on the vehicle as it travels between an origin and a destination.

Figure 1:
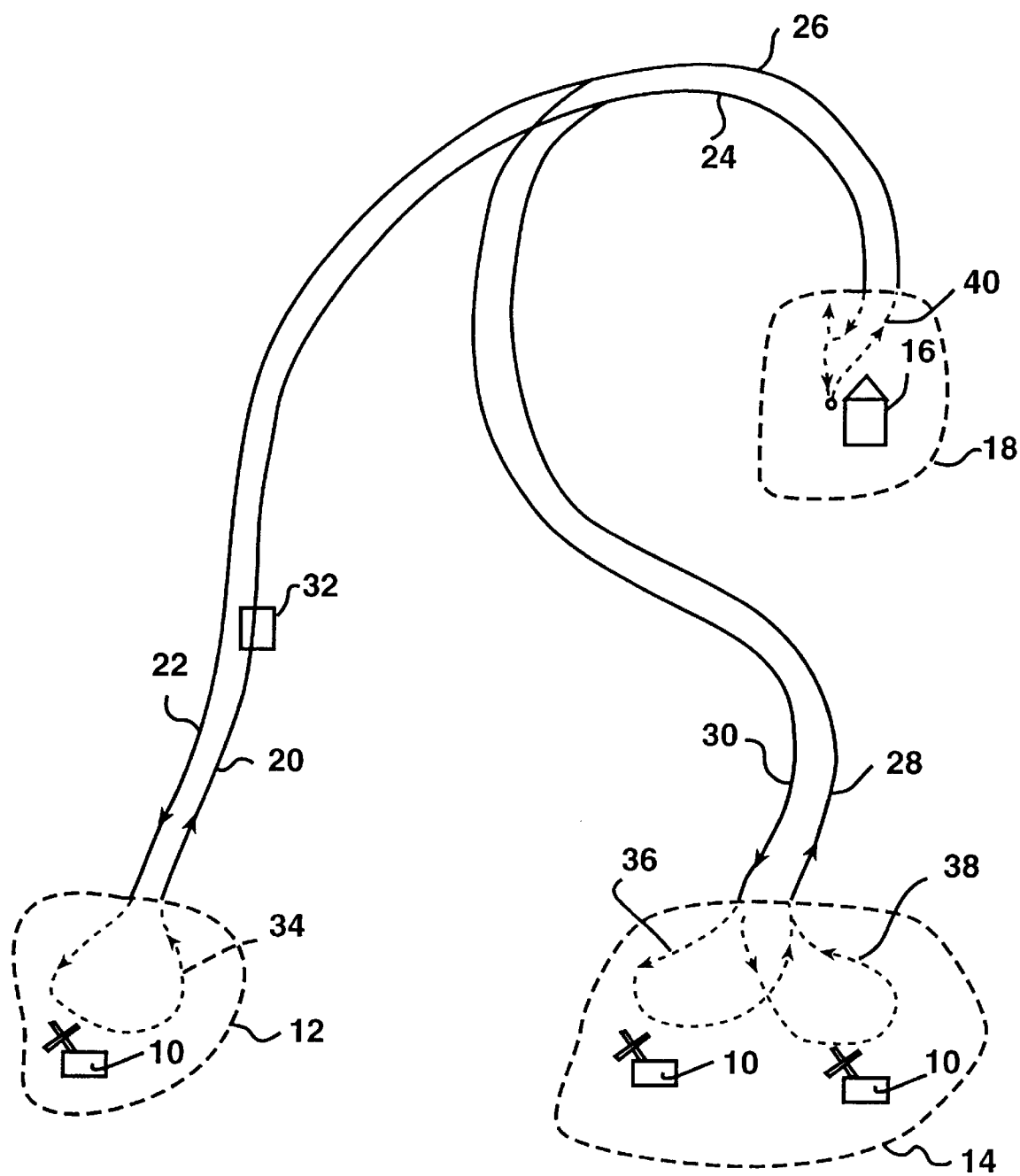
FIG. 1 illustrates in plan view a sample portion of a prior-art map of a surface mine property including routes between typical destination points.

Referring to the drawings, wherein like parts are designated throughout with like numerals and symbols, FIG. 1 illustrates in plan view a sample portion of a map of a surface mine property including exemplary routes between typical destination points. Specifically, excavators 10 are illustrated as mining at two loading sites 12,14 which are connected to a crusher 16 at a site 18 through mine roadways associated with predetermined vehicle trajectories 20,22,24, 26,28,30. Each trajectory represents a predetermined optimal travel path along which an autonomous vehicle 32, such as a haulage truck, is intended to be guided between end destinations (12,14,18) by an autonomous guidance system in order to effect a particular task. Additional alternative trajectories 34,36,38,40 are provided within the sites 12,14, 18 to control the approach and departure of the vehicle 32 to and from the excavators 10 and the crusher 16. In essence, based on current vehicle-position data generated by an on-board GPS or other equivalent positioning unit and using known feedback-control servo mechanisms, the mine's autonomous guidance system controls the motion of the vehicle 32 by performing steering, braking, acceleration, and other functions so as to closely track the trajectory of interest (i.e., the path of trajectory 20, in the case illustrated in the figure). Since present positioning systems have accuracies of the order of a few centimeters, it is possible to obtain very close adherence to the target trajectory. To that end, the pertinent trajectory (selected from the applicable trajectories 20–30), or portion of a trajectory, currently being traveled by the vehicle 32 is stored in the controller's storage unit of the vehicle's microprocessor and used as a target trajectory by the guidance system. Note that these features are well known in the art and do not constitute a novel aspect of the invention.

Figure 2:
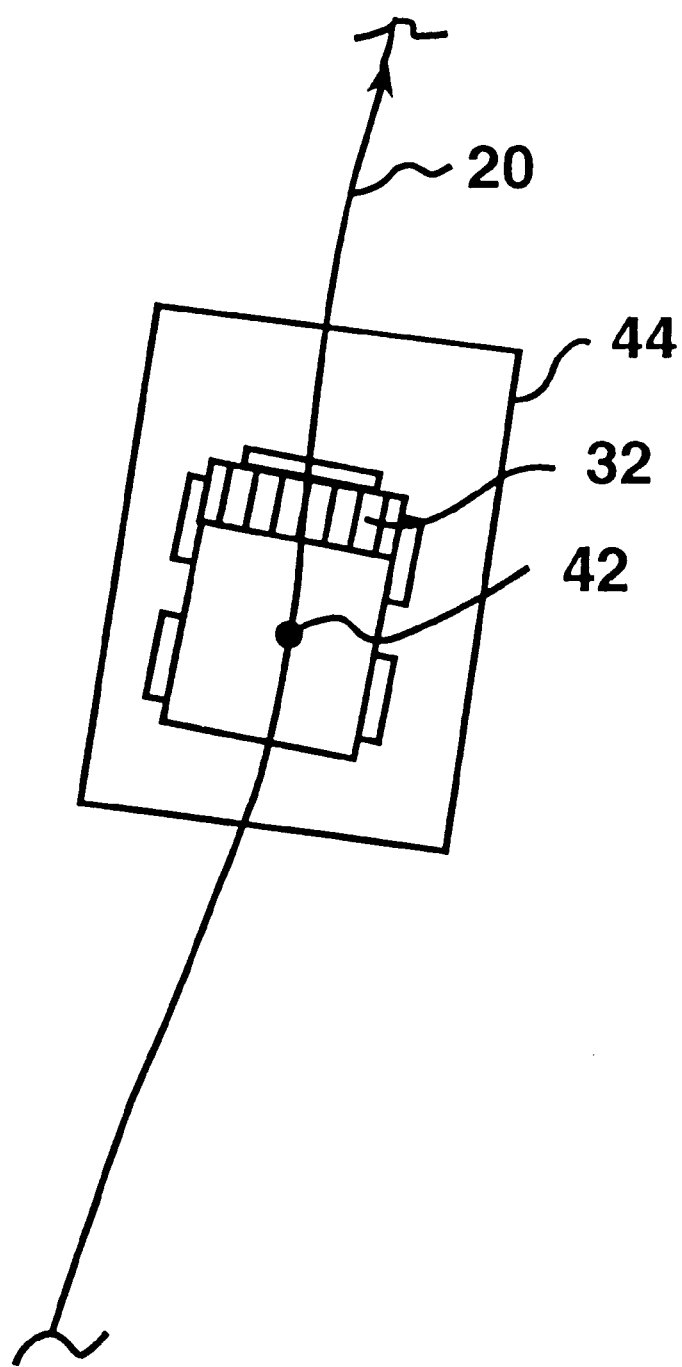
FIG. 2 illustrates schematically the selection of a reference point within a vehicle's physical structure to establish a nominal position for the vehicle within a selected coordinate system.

In practice, a nominal vehicle position within a selected coordinate system is chosen to correspond to the position of a reference point 42 within the vehicle's physical structure, such as its geometric center or the location of a communication antenna, as illustrated in FIG. 2, and the guidance system is programmed to cause that particular point to track the desired trajectory (path 20 in FIG. 1, for example). Obviously, though, the physical dimensions of the vehicle 32 extend beyond the point 42 and a correspondingly larger clear path along the trajectory 20 must be present as the vehicle passes through in order to avoid collisions with nearby obstacles. For example, the length and width of the vehicle 32 define its minimum physical operating space required when the vehicle is at rest. As the vehicle moves along the trajectory 20 under the control of the autonomous guidance system, additional factors must be accounted for to ensure safety, such as steering error, navigational guidance margins, and stopping distance variations due to load, equipment condition, road surface and grade, etc. Thus, the actual physical space required by the vehicle 32 to ensure its safe operation is greater than its size. These variables further contribute to the estimation of the space required by the vehicle to ensure its safe operation. Companion application U.S. Ser. No. 09/521,436 describes a system whereby the vehicle 32 is assigned a safety zone that allows for the vehicle's actual physical presence and for all pertinent operating tolerances defined by a variable safety envelope 44 around the autonomous vehicle 32.

According to the present invention, the guidance system provides for a modified, expanded trajectory (as defined below) consisting of multiple paths to be used alternatively in order to avoid rutting of the roadway. For example, the target position for point 42 of vehicle 32 may be shifted to the left or right of the nominal trajectory 20 by a predetermined offset, thereby defining different paths substantially codirectional with the nominal trajectory 20. Accordingly, a trajectory, in an expanded definition, may also refer to alternative path options within a corridor which may be allowed, instead of a single linear path, in order to achieve the particular operational goals of avoiding rut formation.

Figure 3:
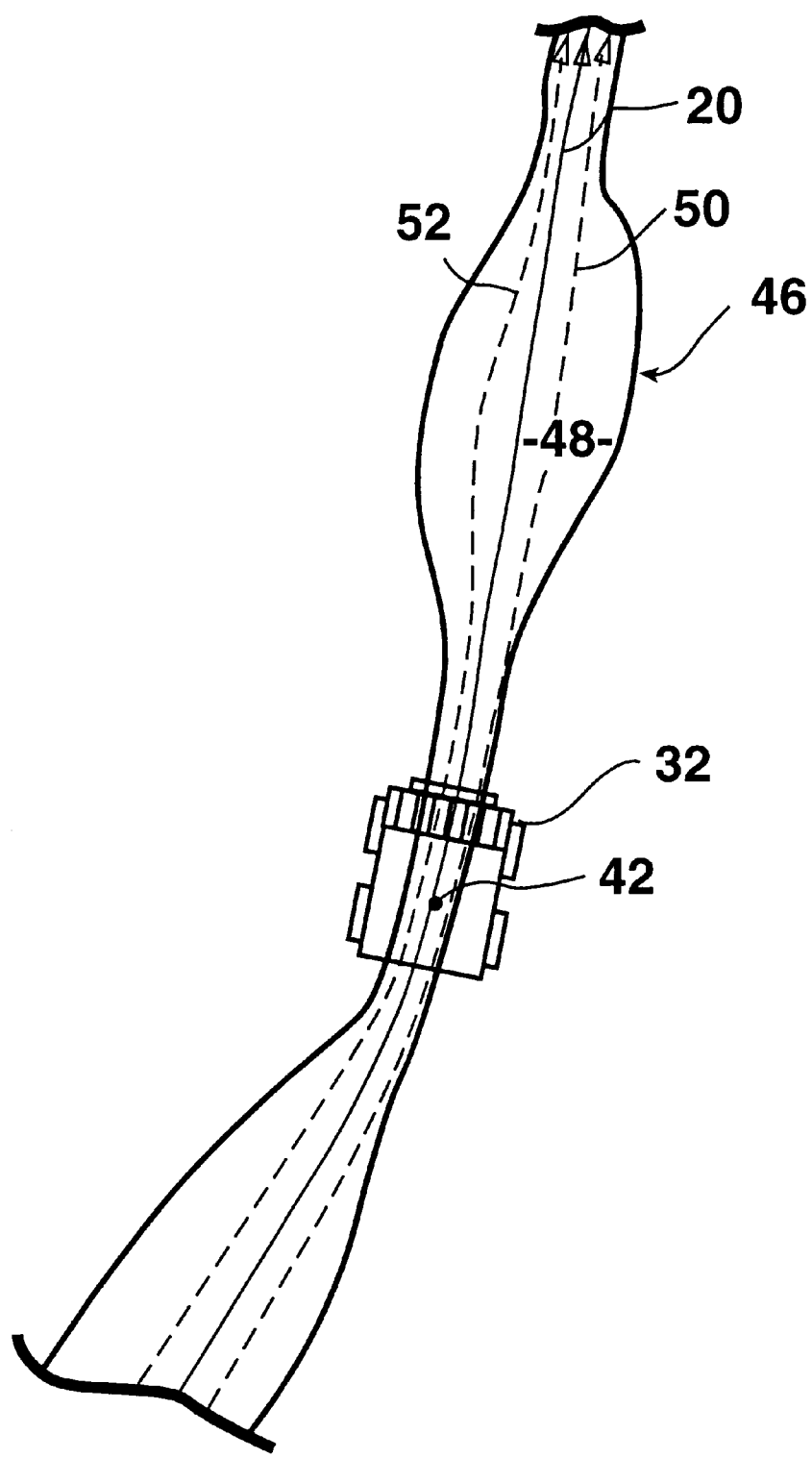
FIG. 3 illustrates the concept of a corridor defining a space around the nominal trajectory of an autonomous vehicle, wherein alternative travel paths are provided by the guidance-control system of the vehicle.

FIG. 3 illustrates a corridor 46 defining a space 48 within which the reference point 42 of vehicle 32 is allowed to move while traveling along the nominal trajectory 20 in order to implement the anti-rut procedure of the invention. As shown, the width of the corridor 46 may vary along the nominal trajectory to account for different terrain, environmental, operational, and other conditions. The corridor 46 may be enlarged, for example, to accommodate bad weather conditions that may more readily cause rapid formation of ruts in the roadways. A wider travel area, assuming that roadway space is available and other operating conditions permit it, makes it possible to reduce travel over any particular precise path, thereby minimizing wear and tear on the road. Simply by shifting the travel path of the vehicle 32 to the right or left of the nominal trajectory 20 to alternative paths 50 or 52, for instance, the guidance control system implements an anti-rut procedure according to the invention.

According to one embodiment of the invention, as the vehicle 32 is guided along its nominal trajectory 20, new paths are continually followed by allowing the random shifting of the vehicle's reference point 42 to any position within the corridor 46 so long as a continuous and smooth travel toward the intended destination is maintained. That is, the vehicle is allowed to continue in its travel without the imposition of further directional controls so long as it remains within the boundaries of the corridor 46. While this random control strategy would appear to ensure the most even travel distribution over the width of the corridor 46 (because of its random nature), in fact it may still lead to the formation of ruts because any pre-existing cut in the road tends to produce a preferential travel path along its trajectory. Therefore, as soon as an initial groove is formed, the free selection of a path is no longer random but, rather, conditioned by the existence of the groove, which in turn leads to the development of a deep rut.

Figure 4:
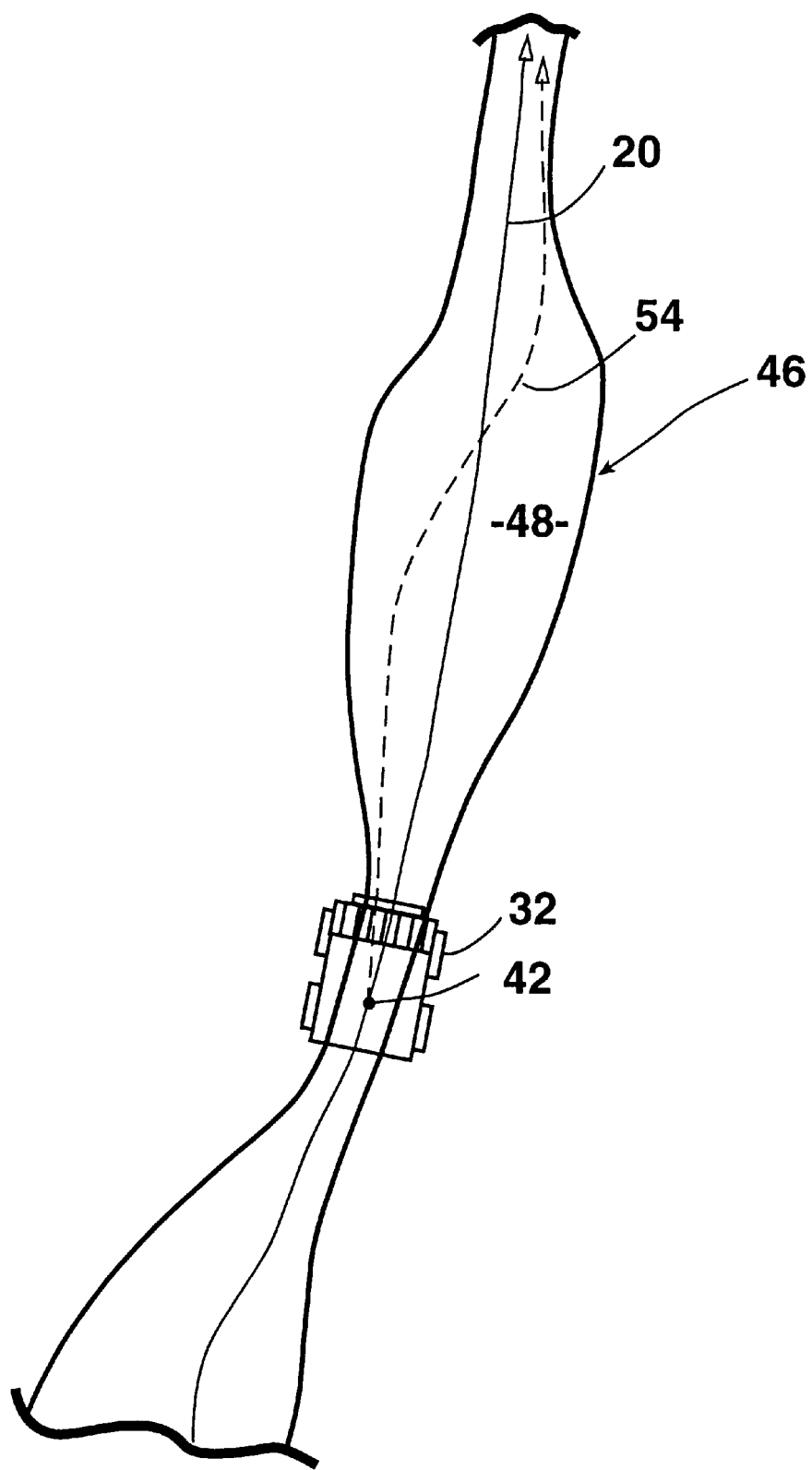
FIG. 4 illustrates a randomly-generated alternative path to the nominal trajectory within the corridor of the invention.

According to another embodiment of the invention, alternative paths within the corridor 46 are generated randomly, but then they are imposed upon the vehicle 46 by its guidance system. That is, for example, an alternative path 54 to the nominal trajectory 52 is generated by a computer ensuring that it remains within the boundaries of the corridor 46, as illustrated in FIG. 4, but on the basis of random steps constrained only by parameters that maintain the general direction and continuity of motion. Thug, the alternative path should not require unusual steering of the vehicle that would affect its normal travel parameters, such as speed and general direction. Once such an alternative path is generated, it is imposed on the vehicle by the guidance controls of the system. Therefore, these alternative trajectories are sequentially imposed by the system and, because they are randomly generated, they are very unlikely to ever repeat themselves.

According to yet another embodiment of the invention, alternative paths are selected not randomly but pursuant to a particular strategy deemed most appropriate for the type of vehicle and road involved. For example, parallel paths may be preferable on corridors having substantially uniform width, while crisscrossing paths may be needed to take full advantage of wider spaces in nonuniform corridors.

It is noted that the invention is implemented through computer software that establishes a corridor along the nominal trajectory of each autonomous vehicle. Once the boundaries of the corridor are established, alternative anti-rut paths are generated, as explained. If desired, the boundaries of the corridor can be updated to account for changes in the road condition of the premises or other operating factors (such as differences in vehicle size or shape, speed or other dynamic parameters, and guidance-control errors and/or tolerances). Thus, according to another aspect of the invention, the corridor may be updated between vehicle iterations or from vehicle to vehicle to provide different space solutions for new alternative anti-rut paths. For example, a corridor may be enlarged under wet conditions to provide a larger area over which to spread the wear and tear of the resulting softer terrain; or the corridor's width may be reduced when dry conditions improve the hardness and durability of dirt roads.

In essence, the novel concept of the invention resides in the idea of allocating a corridor around the nominal trajectory of each vehicle operating in an autonomous system. The space within the corridor is then used to generate alternative paths to the nominal trajectory to be followed by the vehicle in order to minimize rutting. If desired, the corridor boundaries are changed as a function of operating parameters.

The invention is one of several features of a collision avoidance system applied to a conventional guidance system for autonomous vehicles in operations that may also include manned vehicles.

Figure 5:
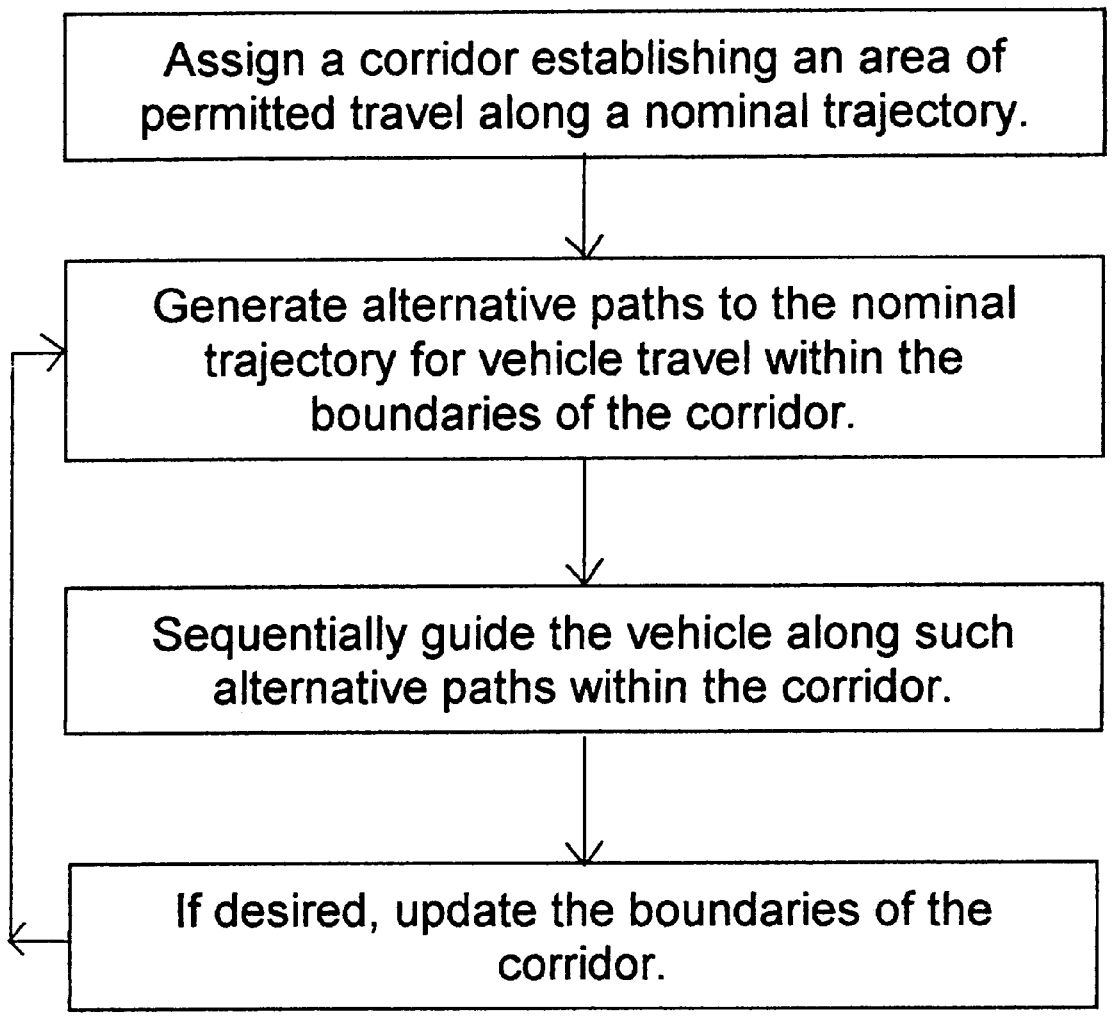
FIG. 5 is a flow chart showing the steps of the invention.

The guidance system and other components of the collision avoidance approach are not part of this invention and, therefore, are not described here. In practice, the invention can be implemented within an existing autonomous system as follows. As illustrated in the flow chart of FIG. 5, each course to be traveled by one or more vehicles between points in the facility is assigned a nominal trajectory with a corresponding corridor defining an area of permitted travel along the nominal trajectory. Alternative paths are generated for travel within the boundaries of the corridor and assigned to each vehicle for sequential use during the course of its operation. If desired, the boundaries of the corridor associated with each nominal trajectory may be changed and new alternative paths correspondingly generated for each vehicle.

Figure 6:
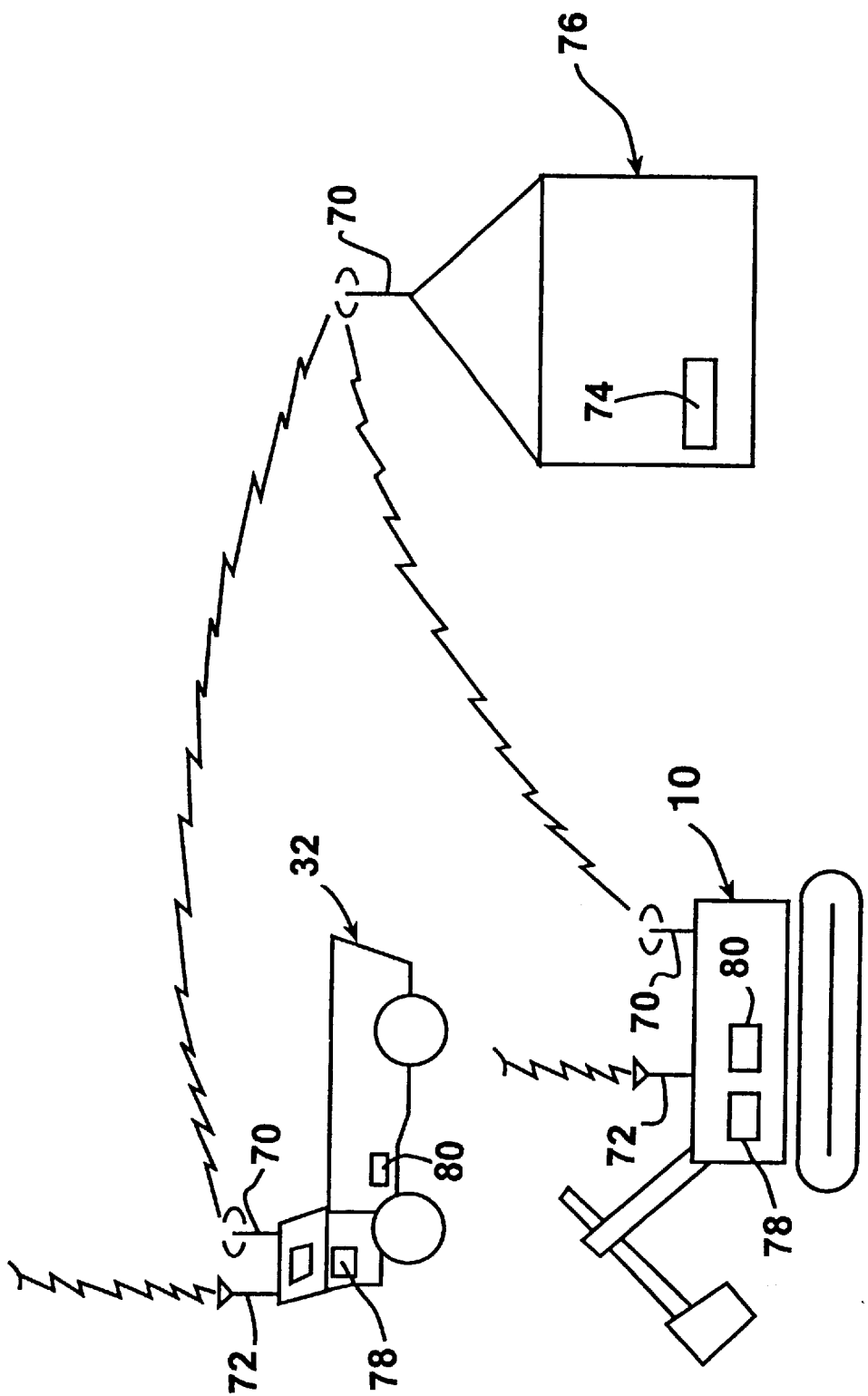
FIG. 6 is a schematic illustration of the apparatus required to implement the invention.

FIG. 6 is a schematic illustration of the apparatus required to implement the anti-rut system of the invention within the autonomous-vehicle traffic-control system of a surface mine. Each excavator 10 and haulage vehicle 32 within the system is equipped with two-way communication apparatus 70 and with a positioning system unit 72 (such as a GPS unit). Mine roadway maps, vehicle nominal trajectories, corresponding corridors and alternative paths, as well as appropriate software to implement the various functions required for the invention, are stored in digital form in a computer 74 (or, equivalently, in a unit of a computer network) housed in a base station 76 which is also equipped with two-way communication apparatus 70. Thus, the precise location of the vehicle 32 can be determined periodically, using its positioning system unit and an on-board processor 78 (with appropriate hardware, software and control modules 80), and communicated to the computer 74 at the base station together with identifying information regarding the particular vehicle 32 being guided. Upon processing of this information, the computer 74 transmits the appropriate set of instructions to the on-board processor 78 to guide the vehicle to the intended destination according to the invention using appropriate hardware and guidance software incorporated within the vehicle. The control mechanisms and related processing hardware and software required to implement the various steps of the invention are well known in the art.

Various changes in the details, steps and components that have been described may be made by those skilled in the art within the principles and scope of the invention herein illustrated and defined in the appended claims. For example, the invention has been illustrated, and for simplicity it is currently preferably implemented, in terms of two-dimensional nominal trajectories and alternative paths, but the concept would apply in equivalent fashion to a three-dimensional implementation. In practice, the approximation introduced by a 2-D model does not affect the system sufficiently to warrant the additional complication of a 3-D model, although the latter could be implemented successfully with modern positioning systems. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and procedures.

We claim:

1. In an autonomous vehicle system wherein traffic control apparatus guides a vehicle along a corresponding nominal travel trajectory on a roadway, a method for reducing the formation of ruts in the roadway, the method comprising the following steps:
   (a) generating alternative paths for travel by the vehicle along said nominal travel trajectory; and
   (b) sequentially guiding the vehicle to travel along a plurality of said alternative paths.

2. The method of claim 1, further including the step of establishing a corridor defining boundaries available for travel by the vehicle around said nominal trajectory; wherein said alternative paths are contained within the corridor.

3. The method of claim 2, wherein said boundaries are variable.

4. The method of claim 1, wherein said step (a) is carried out by randomly selecting said alternative paths.

5. The method of claim 2, wherein said step (a) is carried out by randomly selecting said alternative paths within the corridor.

6. The method of claim 3, wherein said step (a) is carried out by randomly selecting said alternative paths within the corridor.

7. The method of claim 1, wherein said step (a) is carried out by selecting said alternative paths in parallel to the nominal trajectory.

8. The method of claim 2, wherein said step (a) is carried out by selecting said alternative paths in parallel to the nominal trajectory within the corridor.

9. The method of claim 3, wherein said step (a) is carried out by selecting said alternative paths in parallel to the nominal trajectory within the corridor.

10. The method of claim 3, wherein said boundaries are variable as a function of vehicle dimensions.

11. The method of claim 3, wherein said boundaries are variable as a function of vehicle dynamic parameters.

12. The method of claim 3, wherein steps (a) and (b) are repeated periodically after said boundaries have been varied.

13. The method of claim 1, wherein said autonomous vehicle system is implemented in a surface mine.

14. In an autonomous vehicle system wherein traffic control apparatus guides a vehicle along a corresponding nominal travel trajectory on a roadway, apparatus for reducing the formation of ruts in the roadway, the apparatus comprising the following:
   (a) means for generating alternative paths for travel by the vehicle along said nominal travel trajectory; and
   (b) and means for sequentially guiding the vehicle to travel along a plurality of said alternative paths.

15. The apparatus of claim 14, further including means for establishing a corridor defining boundaries available for travel by the vehicle around said nominal trajectory; wherein said alternative paths are contained within the corridor.

16. The apparatus of claim 14, wherein said boundaries are variable.

17. The apparatus of claim 14 wherein said autonomous vehicle system is implemented in a surface mine.

* * * * *